Q. SANTICOLA.
SALAD DRESSING CONTAINER.
APPLICATION FILED JULY 28, 1915.
1,219,491.
Patented Mar. 20, 1917.
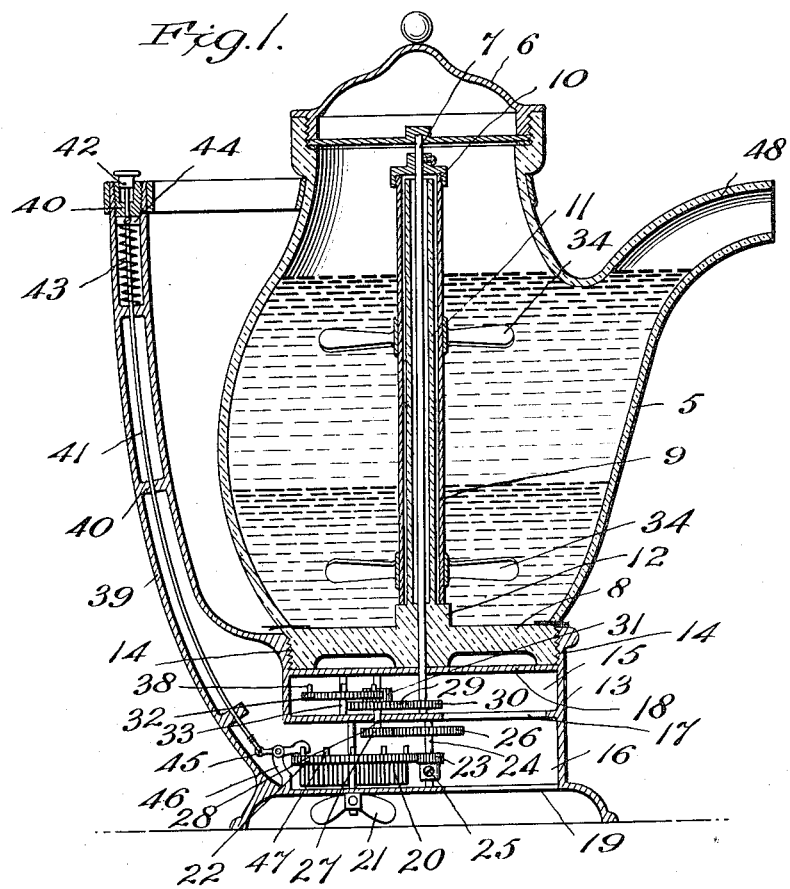
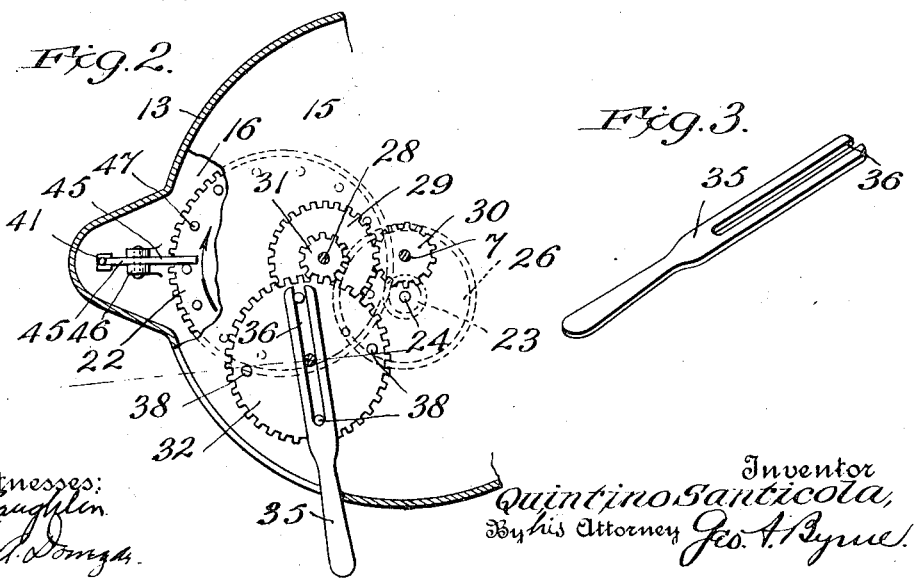
Witnesses:
Inventor
Quintino Santicola,
By his Attorney Geo. A. Byrne

UNITED STATES PATENT OFFICE.

QUINTINO SANTICOLA, OF CLEVELAND, OHIO.

SALAD-DRESSING CONTAINER.

1,219,491.  Specification of Letters Patent.  Patented Mar. 20, 1917.

Application filed July 28, 1915. Serial No. 42,306.

*To all whom it may concern:*

Be it known that I, QUINTINO SANTICOLA, a subject of the King of Italy, residing at Cleveland, State of Ohio, have invented certain new and useful Improvements in Salad-Dressing Containers, of which the following is a specification.

The invention relates to salad dressing containers of the type shown and described in my Patent No. 1,147,554, dated July 20th, 1915.

The general object of the present invention is to adapt a salad dressing container to be operated either by manual or by motor power, as distinguished from the structure shown in my Patent No. 1,147,554, above mentioned, which is operable solely by manual power. And to this end the invention resides in adapting the actuating mechanism for the agitator, to be operated either by a motor or by a manually operable lever.

Other objects will appear and be better understood from that embodiment of my invention of which the following is a specification, reference being had to the accompanying drawings forming part hereof, in which:

Figure 1 is a vertical longitudinal section of the invention.

Fig. 2 is a detail sectional plan of the devices for operating the agitator mechanism.

Fig. 3 is a detail perspective of the hand lever.

The receptacle 5 for the salad dressing may be of glass or any other material found suitable for the purpose. As shown in my Patent No. 1,147,554 the cover 6 of this receptacle is adapted to provide a bearing for the inner shaft 7 of the agitator mechanism. The bottom 8 of receptacle 5 also provides a bearing for the lower end portion of shaft 7 which extends through the said bottom; and further, the said bottom provides a bearing support for the outer or tubular portion 9 of the agitator shaft mechanism, which outer tubular portion is connected to the shaft 7 by means of coupling collar 10. By reason of this connection shafts 7 and 9 will move as a unit. The usual spacing or centering element 11 is interposed between shafts 7 and 9 and bears at one end on the boss 12 on bottom 8.

The casing 13 which is connected to bottom 8 in any suitable manner as by screw threads 14, may be formed of any material found suitable for the purpose, as metal. Interiorly, this casing is divided into an upper compartment 15 and a lower compartment 16. The lower end of shaft 7 extends into upper compartment 15 and has a bearing in the division wall 17 between compartments 15 and 16, and preferably at the center of said division wall. By the provision of division wall 17, top 18 and bottom 19 of casing 13, suitable bearings are had for the working parts of the mechanisms about to be described. One of such mechanisms is arranged in compartment 15 and is adapted, when connected with a hand operated implement, hereinafter to be described, to oscillate the agitator mechanism. The other of such mechanisms is arranged in compartment 16 and includes a motor and an element for detachably connecting the motor to the agitator mechanism. By reason of this detachable connection between the motor and the agitator mechanism, the said motor may be disconnected from the said agitator mechanism when it is desired to operate the same manually.

In that embodiment of my invention shown in the accompanying drawings, motor 20 is illustrated as a spring motor of any preferred or well-known construction and arranged so as to be wound or energized by turning a key 21. Incorporated with motor 20 is a gear wheel 22 which meshes with a pinion 23 adjustably mounted on shaft 24 which shaft has bearings in division wall 17 and bottom 19. A set screw 25 being provided to secure the pinion in any of its adjusted positions on shaft 24. A gear wheel 26 secured to shaft 24 meshes with pinion 27 mounted on shaft 28 which has bearings in top 18 and division wall 17. Gear wheel 29 on shaft 28 is arranged in compartment 15 and meshes with pinion 30 on the lower end portion of shaft 7. Pinion 31 secured to shaft 28 above gear wheel 29, meshes with gear wheel 32 which is secured to shaft 33, the said shaft 33 having bearings in top 18 and division wall 17. Manifestly, with this construction and upon operation of motor 20, motion will be transmitted to shaft 7 through pinion 23, gear wheel 26, pinion 27, gear wheel 29, and pinion 30. During this action on the part of the several pinions and gear wheels, pinion 31 and gear wheel 32 will move as idlers. Remembering now that tubular shaft 9 is connected to turn as a unit with shaft 7, it can be readily seen that upon the turning movement of said tubular shaft 9 the agitator blades 34 on the said tubular shaft, will operate to stir the mass of salad dressing contained in bowl 5. By preference the motor will be disconnected from the agitator mechanism during the initial mixing of the components of the dressing and this disconnection of the parts will be effected by unscrewing set screw 25 from contact with shaft 24 in order to permit of sliding pinion 23 from engagement with gear wheel 22. In effecting the initial mixing of the ingredients of the salad dressing the hand lever 35 is inserted through a lateral slot in casing 13, communicating with compartment 15 and the recessed end portion 36 of lever 35 is set astride shaft 33 so as to receive any of a plurality of pairs of diametrically opposed upstanding pin 38 on gear wheel 32. When the lever is connected to a pair of oppositely disposed pins as shown in Fig. 2, its outer end portion will extend beyond the casing for a sufficient distance to provide a convenient handhold, whereby to permit the lever and the agitator mechanism to be readily oscillated. Since the property of salad dressing, upon the precipitation of its heavier components, is such as requires only a relatively slight agitation to effect a co-mingling of its ingredients, it has been found that the agitator mechanism when operated by the motor, will readily effect this required re-mixing. Now in order that the action of the motor may be readily controlled by that hand of the operator which holds the container by the handle, I have incorporated with the handle 39 a simple form of control, one embodiment of which is shown in Fig. 1. In that figure it will be noted that the handle 39 is tubular and provided at chosen intervals with bearings 40 through which extend a somewhat flexible rod 41, the upper end of which is provided with a button 42 projected for a portion of its length beyond the upper end of the handle by a spring 43 whose ends bear on one of the bearings 40 and on a collar 44 on rod 41. The lower end of rod 41 is pivotally connected to a dog 45 fulcrumed on a lug 46 and arranged so as to enter the path of movement of a circular series of pins 47 on gear wheel 22. Dog 45 being horizontally pivoted as viewed in Fig. 1, may readily be moved out of the path of movement of pins 47 by simply depressing button 42 with the thumb of the hand which holds handle 39. Upon the removal of thumb pressure from button 42 spring 43 will restore the dog to its normal position in the path of movement of pins 47, and thus bring about the stoppage of the said motor when one of the said pins moves into contact with the said dog.

The salad dressing is discharged through the spout 48 and when the parts are positioned as shown in Fig. 1, the agitation of the dressing may be continued throughout the action of discharging it from the container.

What is claimed as new is:

1. A portable salad dressing container, comprising a casing having a handle, disposed so as to be engageable by the hand in carrying the container; a receptacle mounted on the casing and communicating therewith; an agitator disposed in the receptacle; means for operating the agitator and disposed in the casing; and hand-operative means for controlling the agitator operating means and connected to the handle and disposed so as to be accessible to the hand when the container is held thereby.

2. A portable salad dressing container, comprising a casing having a tubular handle disposed so as to be engageable by the hand in carrying the container; a receptacle mounted on the casing and communicating therewith; an agitator disposed in the receptacle; means for operating the agitator, and disposed in the casing, and a hand-operative means mounted in the handle and disposed so as to be accessible to the hand when the container is held thereby.

3. A portable salad dressing container, comprising a casing having a tubular handle disposed so as to be engageable by the hand in carrying the container; a receptacle mounted on the casing and communicating therewith; an agitator disposed in the receptacle; means for operating the agitator and disposed in the casing; and hand-operative spring-actuated means for controlling the agitator operating means and mounted in the handle and disposed so as to be accessible to the hand when the container is held thereby.

4. A portable salad dressing container comprising a casing, having a tubular handle disposed so as to be engageable by the hand in carrying the container; a receptacle mounted on the casing and communicating therewith; an agitator disposed in the receptacle; a motor for operating the agitator and disposed in the casing; and a hand-operative spring actuated means of controlling the motor and mounted in the handle and disposed so as to be accessible to the hand when the container is held thereby.

5. A portable salad dressing container, comprising a casing having a tubular handle disposed so as to be engageable on a hand in carrying the container; a receptacle mounted on the casing and communicating therewith; said handle also connected to the receptacle; an agitator disposed in the receptacle; means for operating the agitator and disposed in the casing; and a hand-operative spring actuated means for controlling the agitator operating means and mounted in the handle and disposed so as to be accessible to the hand when the container is held thereby.

6. A portable salad dressing container, comprising a casing having a handle disposed to be engaged by the hand in carrying the container; a receptacle detachably mounted on the casing; an agitator disposed in the receptacle; an agitator mechanism for operating the agitator and disposed in the casing; a motor detachably connected to the agitator mechanism and also disposed in the casing; and a hand-operative means connected to the handle and arranged for controlling the operation of the motor.

7. A portable salad dressing container comprising a casing having a tubular handle disposed so as to be engageable by the hand in carrying the container; a receptacle detachably mounted on the casing and communicating therewith; an agitator disposed in the receptacle; an agitator mechanism for operating the agitator and disposed in the casing; a motor detachably connected to the agitator mechanism and also disposed in the casing; and a hand-operative spring actuated means for controlling the operation of the motor and mounted in the handle, and disposed so as to be accessible to the hand when the container is held thereby.

In testimony whereof, I have signed my name to this specification in the presence of two subscribing witnesses, this 23rd day of July 1915.

QUINTINO SANTICOLA.

Witnesses:
  E. C. WARNER,
  J. M. DAVIS.